(12) United States Patent
McCarty et al.

(10) Patent No.: US 9,038,664 B2
(45) Date of Patent: May 26, 2015

(54) FLUID FLOW CONTROL DEVICE HAVING A SEAT RING RETAINER

(75) Inventors: Michael McCarty, Marshalltown, IA (US); Michel K. Lovell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 306 days.

(21) Appl. No.: 11/943,330

(22) Filed: Nov. 20, 2007

(65) Prior Publication Data
US 2009/0127488 A1 May 21, 2009

(51) Int. Cl.
F16K 1/42 (2006.01)

(52) U.S. Cl.
CPC .. *F16K 1/427* (2013.01); *F16K 1/42* (2013.01)

(58) Field of Classification Search
CPC ............ F16K 1/42; F16K 1/425; F16K 1/427
USPC ............... 137/625.3, 625.33, 625.37, 625.38; 251/360, 363, 361, 362
See application file for complete search history.

(56) References Cited

U.S. PATENT DOCUMENTS

| | | | | |
|---|---|---|---|---|
| 2,935,995 A | * | 5/1960 | Rucker | 137/329.04 |
| 2,985,424 A | * | 5/1961 | Anderson et al. | 251/332 |
| 3,428,076 A | * | 2/1969 | Lowe | 137/329.05 |
| 3,894,716 A | * | 7/1975 | Barb | 251/127 |
| 3,917,221 A | * | 11/1975 | Kubota et al. | 251/127 |
| 4,249,574 A | * | 2/1981 | Schnall et al. | 137/625.3 |
| 4,474,208 A | * | 10/1984 | Looney | 137/516.29 |
| 4,617,963 A | * | 10/1986 | Stares | 137/625.3 |
| 4,632,146 A | * | 12/1986 | Looney | 137/539.5 |
| 4,671,321 A | * | 6/1987 | Paetzel et al. | 137/625.3 |
| 4,834,133 A | * | 5/1989 | LaCoste et al. | 137/315.11 |
| 4,846,614 A | | 7/1989 | Steinbock | 411/307 |
| 5,083,889 A | | 1/1992 | Steinbock | 411/432 |
| 5,249,774 A | | 10/1993 | Mazel et al. | |
| 5,377,954 A | * | 1/1995 | Adams et al. | 251/306 |
| 5,692,725 A | * | 12/1997 | Fehringer | 251/306 |
| 5,964,248 A | * | 10/1999 | Enarson et al. | 137/625.39 |

(Continued)

FOREIGN PATENT DOCUMENTS

| | | |
|---|---|---|
| CN | 2435574 Y | 6/2001 |
| CN | 200961704 Y | 10/2007 |

(Continued)

OTHER PUBLICATIONS

International Search Report, International Application No. PCT/US2008/083214, mailed Feb. 12, 2009.

(Continued)

*Primary Examiner* — Kevin Murphy
(74) *Attorney, Agent, or Firm* — Marshall, Gerstein & Borun LLP

(57) ABSTRACT

A control valve having a retainer for securing a seat ring within the valve body of the device is disclosed. The seat ring is disposed within a bore in the fluid flow path of the valve body of the control valve, and the retainer is attached to the inner surface of the valve body to retain the seat ring within the bore. The retainer includes threaded openings therethrough for receiving bolts that are tightened down on the seat ring to hold the seat ring against the inner surface of the bore and/or a gasket to form a tight seal and prevent leakage when the control device is in the closed position.

23 Claims, 3 Drawing Sheets

(56) References Cited

U.S. PATENT DOCUMENTS

| | | | |
|---|---|---|---|
| 6,095,186 A | 8/2000 | Nagel | 137/516.29 |
| 6,112,396 A | 9/2000 | Steinbock | 29/452 |
| 6,199,453 B1 | 3/2001 | Steinbock | 81/57.38 |
| 6,263,764 B1 | 7/2001 | Steinbock | 81/57.38 |
| 6,655,659 B2 | 12/2003 | Burke | 251/314 |
| 2005/0211942 A1 | 9/2005 | Koester et al. | 251/315.01 |
| 2005/0269545 A1 | 12/2005 | Chiba et al. | 251/315.07 |

FOREIGN PATENT DOCUMENTS

| | | |
|---|---|---|
| EP | 0 134 866 | 3/1985 |
| EP | 0566430 A1 | 10/1993 |
| FR | 2 686 136 | 7/1993 |
| GB | 18648 | 0/1910 |
| GB | 917174 | 1/1963 |
| JP | 03-057569 | 6/1991 |
| JP | 2000-18417 | 1/2000 |
| JP | 2006-177383 A | 7/2006 |
| WO | WO-9600358 A1 | 1/1996 |
| WO | WO 2006/067888 | 6/2006 |

OTHER PUBLICATIONS

Written Opinion of the International Searching Authority, mailed Feb. 12, 2009.

Office Action for Chinese Patent Application No. 200880116817.8, dated Jul. 21, 2011.

Examination Report for GCC Patent Application No. 2008/12191, dated Oct. 15, 2012.

Office Action for Japanese Patent Application No. 2010-534139, dated Apr. 16, 2013.

Chinese Office Action issued by Chinese Patent Office on Nov. 15, 2013 in corresponding Chinese Patent Application No. 201210151101, and partial English translation thereof.

\* cited by examiner

FLUID FLOW CONTROL DEVICE HAVING A SEAT RING RETAINER

FIELD OF THE DISCLOSURE

The present disclosure generally relates to fluid flow control devices, and more particularly, to a seat ring retainer for engaging a seat ring to form a seal between the seat ring and an inner surface of the valve body of such a fluid flow control device.

BACKGROUND OF THE DISCLOSURE

Fluid flow control devices, such as a control valves and regulators, are commonly used to control fluid flowing through a pipe. A typical fluid control device, such as a control valve, includes a valve body defining an inlet, an outlet, and a fluid flow path extending between the inlet and the outlet. A valve seat within a seat ring may be coupled to the body to define an orifice and closure surface within the flow path. A throttling element, such as a valve plug, is moveable relative to the seat ring to control fluid flow through the orifice. Certain fluid flow control devices employ internal components, such as a cage, which may guide movement of the valve plug in the control valve and may characterize fluid flow between the inlet and outlet. The cage generally defines an interior bore sized to receive the throttling element and typically includes at least one passage through which the fluid flow path passes. The throttling element is moveable between an open and a closed position in which the throttling element modulates or controls the fluid flow relative to the seat ring. In the closed position, the throttling element engages the valve seat within the seat ring, typically positioned at a distal end of the cage, to substantially prevent fluid flow through the valve. It is generally understood that the valve seat, and therefore the seat ring, preferably aligns within the throttling element and matches its concentricity to provide fluid tight closure or shutoff.

Conventional fluid flow control devices employ various methods for retaining the seat ring within the valve body and aligning the seat ring with the throttling element. One such method for retaining the seat ring uses a threaded engagement between a seat ring and a valve body. That is, an outer surface of the seat ring may be threaded such that the seat ring may be screwed into a corresponding threaded surface within the valve body along the flow path. To affect a seal between the seat ring and the interior surface of the valve body, a substantial amount of torque must be applied to the seat ring during assembly. The necessary amount of torque generally increases exponentially as the diameter of the port (i.e. the diameter of the orifice) increases. However, the large torque applied to the seat ring in such a design can result in radial distortion of the seat ring that may compromise the seal between the valve body, the seat ring and the throttling element, thereby reducing or degrading the shutoff capability of the valve.

Moreover, it can be difficult to apply the required torque to the screwed-in seat rings to provide an acceptable seal. That is, the location of the seat ring with respect to the internal flow paths may make accessing the seat ring difficult. Additionally, special tools are typically required for assembly of the screwed-in seat ring in the valve body. These difficulties also extend to removal of the screwed-in seat rings for repair and/or replacement. Repair and/or replacement of the seat ring may be further complicated by the relatively high contact stresses between the screwed-in seat ring and the valve body that may damage the threaded engagement at the valve body when the seat ring is installed.

In another method for installing conventional seat rings in a fluid flow control device, a seat ring may be directly bolted into a valve body to secure the seat ring in place. That is, the seat ring may be fabricated with through-holes about the periphery of the seat ring to receive bolts that secure it to the valve body. The bolt-in seat ring typically requires multiple tappings in the valve body for receiving the bolts. Because the bolts attaching the seat ring are in tension, high strength materials are required to fabricate the fluid flow control device. In some devices, the high strength bolting requirements limit the acceptable material choices to more expensive materials such as the nickel-based alloy Inconel 718 available from Specialty Metals of Kokomo, Ind. Similar to screwed-in seat rings, high bolt torques are required to retain the seat ring in the valve body and may be difficult to apply to bolts located down inside the valve body. The high bolt torque may also increase the possibility of seat ring distortion (i.e. making the seat ring substantially non-planar and/or non-axial) that may result in leakage between the seat ring and the valve body, or between the seat ring and the throttling element. Additionally, bolts in tension may be more susceptible to stress-corrosion cracking.

In other examples, a seat ring may be welded to an interior wall of a valve body. Control valves having welded-in seat rings are expensive to fabricate and install. In many cases, the valve body must be spun on a vertical lathe to machine the seat ring or special tooling is required to machine the seat while the valve body stays stationary. Either manufacturing method is expensive to implement and very expensive to repair.

Anther method for retaining a seat ring within a fluid flow control device is to provide a clamping element, such as a cage or seat ring retainer, to clamp the seat ring in place. These conventional clamping elements can add significant expense to the fluid flow control devices over other devices that do not secure the seat ring in such a manner. Moreover, where the seat ring, the clamping element and/or the valve body are fabricated from different materials, a differential thermal expansion between the valve body and the clamping element can significantly limit the operating temperature range of the fluid flow control device. Additionally, different temperature zones resulting from variable material thickness within the valve body can further exacerbate differential thermal expansion. One typical solution to prevent leakage due to differential thermal expansion is to fabricate the valve body, seat ring and clamping element from materials with similar coefficients of thermal expansion. However, this may result in adding significant cost to valve.

Further, a clamped seat ring typically requires a gasket between the seat ring and the valve body to provide a fluid seal therebetween. The gasket loading force must originate at the body-to-bonnet bolting and be transferred through the bonnet to the cage to the seat ring to load the gasket. The necessary force needed to form the seal at the gasket can require larger body-to-bonnet bolts, additional material within the valve body web, and thicker flanges at the inlet and outlet of the valve—all of which increase the cost of the control valve.

In large flow control devices, for example a control valve having a port size or seat ring cross-sectional area of at least six inches in diameter, it is generally understood that maximizing port size is critically important in increasing fluid flow capacity (i.e., the flow capacity of the valve is directly proportional to the square of the port area). To accommodate larger seat rings for increased flow capacity for a given fluid flow device body, the opening or head of the fluid flow device may have to be increased in diameter to receive the larger seat ring, which causes an increase in bolting requirements as previously discussed.

Another method to increase the port size relates to maximizing the seat ring opening or port. To maximize the port area, the seat ring may be made "thinner" by removing material about the periphery of the seat ring to enable the seat ring to pass into the head of the valve body for a given valve size while removing material from the interior of the seat ring to increase the orifice diameter. As the seat ring becomes thinner, it may become more susceptible to distortion when the seat ring is tightened down onto the valve body using any of the methods described above. Seat ring distortion is a primary contributor to fluid flow control device leakage, which can lead to trim damage (e.g. high velocity flows that may cause plug or seat erosion in high pressure applications) in the device. It is also more difficult to affect a satisfactory seal between large seat rings and their respective/receiving bodies.

In view of the existing methods for retaining seat rings within fluid flow control devices, and the operating requirements and ranges for the devices, a need exists for an improved seat ring retention mechanism and method that allow the fluid flow control devices to be manufactured easier, potentially with reduced cost and without the need for special tools or machining processes, and that facilitate the repair and replacement of the seat rings when necessary. Further, the need exists for an improved seat ring retention mechanism that securely retains the seat ring within the body of the device without causing distortion of the seat ring and the accompanying leakage issues, even in larger fluid flow control devices.

DETAILED DESCRIPTION

Figure 1:
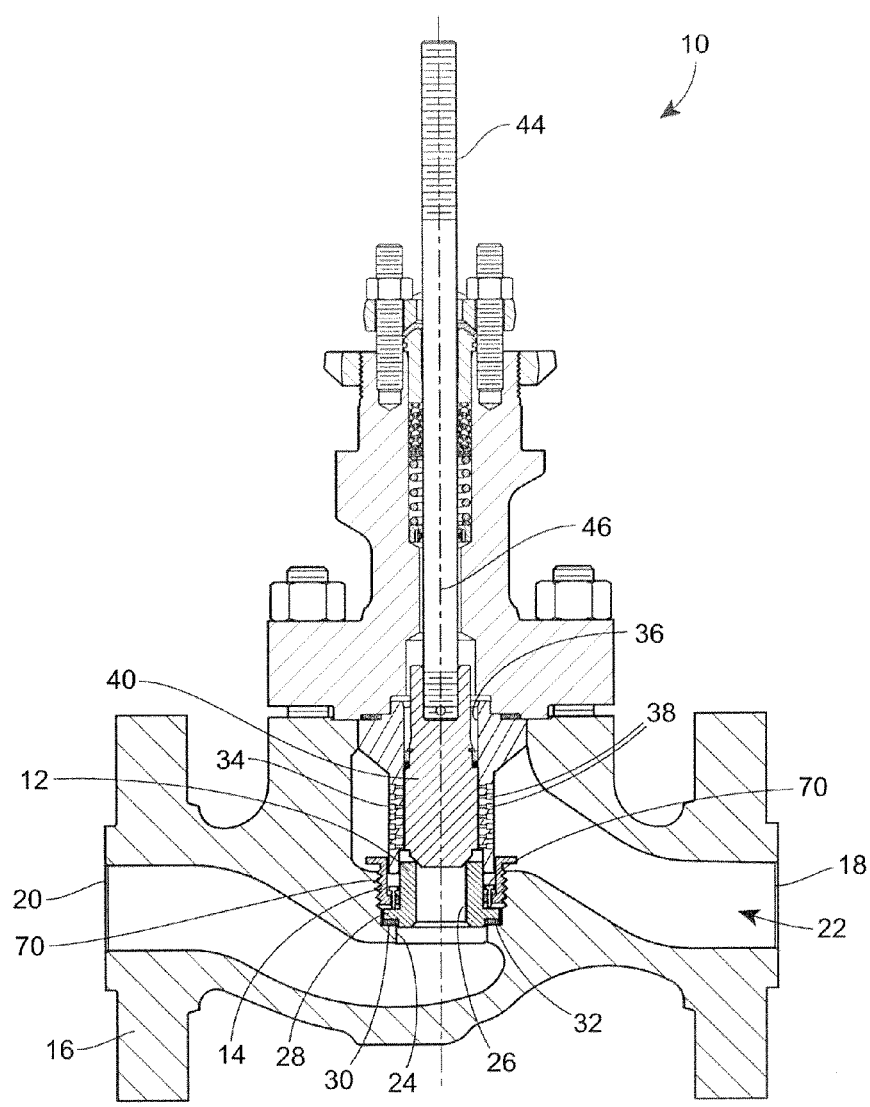
FIG. 1 is a side elevation view, in cross-section, of a fluid flow control device having a threaded retainer securing a seat ring within a body of the device.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention. For example, the present invention may be described in context of a fluid flow control device as a control valve, but one of ordinary skill in the art appreciates that any fluid flow control device using a seat ring and throttling element such as a regulator.

It should also be understood that, unless a term is expressly defined in this patent using the sentence "As used herein, the term '_____' is hereby defined to mean . . . " similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

A fluid flow control device having a retainer for securing a seat ring within the body of the device is disclosed. The seat ring is located within a bore in the fluid flow path of the body of the fluid flow control device, and the retainer is attached to the inner surface of the body to retain the seat ring within the bore. The retainer includes threaded openings therethrough for receiving bolts that are tightened down on the seat ring to hold the seat ring against the inner surface of the bore and/or a gasket to form a tight seal and prevent leakage when the control device is in the closed position. In one embodiment of a coupling mechanism for connecting the retainer within the valve body of the fluid flow control device, the retainer includes a threaded outer surface and the bore of the valve body includes a corresponding threaded inner surface such that the retainer is screwed into the bore after the seat ring is inserted. In an alternative embodiment of a coupling mechanism, a bayonet-type connection between the retainer and the valve body is provided by outwardly extending tabs of the retainer and corresponding L-shaped recesses in the inner surface of the valve body. The tabs are inserted into the recesses, and the retainer is partially rotated so that the tabs are engaged by overhanging portions of the recesses to secure the retainer in position. These and other embodiments of the retainer are further discussed below and/or are contemplated by the inventors as having use in a fluid flow control device in accordance with the present disclosure.

Figure 2:
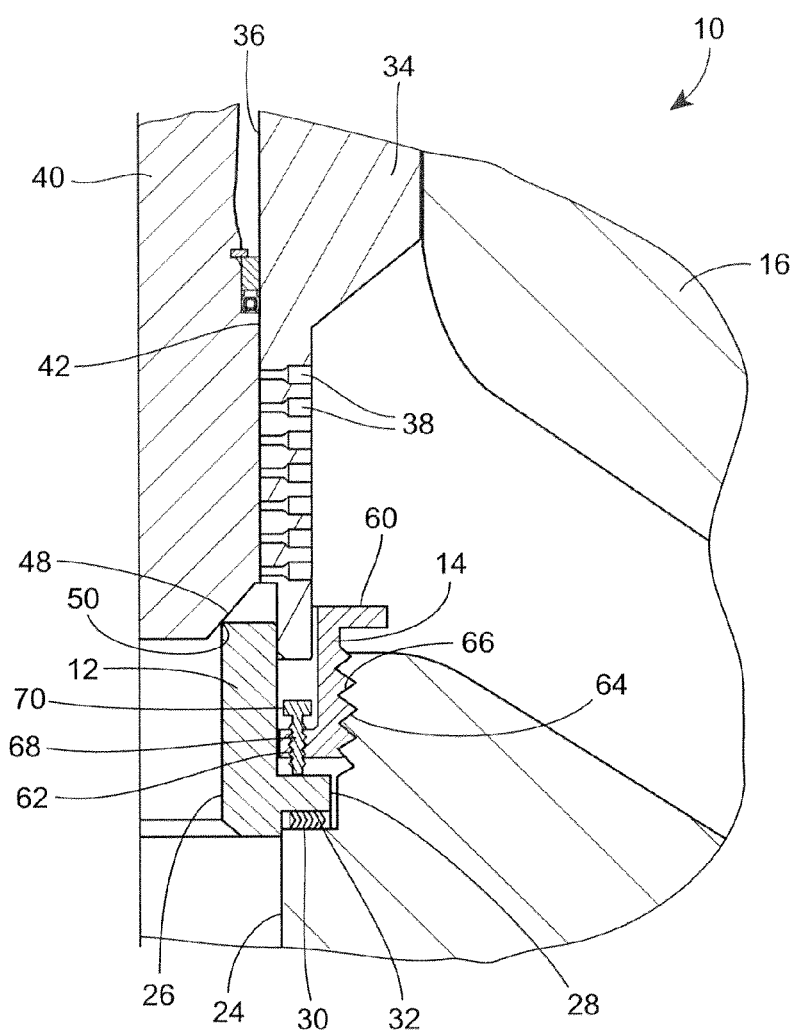
FIG. 2 is an enlarged view of a detail of FIG. 1 in cross-section.

FIGS. 1 and 2 illustrate a first embodiment of a fluid flow control device in the form of a control valve 10 with a valve seat ring 12 held in place by a threaded retainer 14. The control valve 10 includes a valve body 16 defining an inlet 20, an outlet 18, and fluid flow path 22 extending from the inlet 20 to the outlet 18. The valve seat ring 12 is disposed within a bore 24 of the valve body 16 and defines an orifice 26 through which the fluid flow path 22 passes. The valve seat ring 12 includes an outwardly extending flange 28 having a bottom surface resting on a shoulder 30 within the bore 24. A gasket 32 may be disposed between the flange 28 and the shoulder 30 to form a seal preventing leakage around the exterior of the seat ring 12 when the control valve 10 is in the shutoff or closed position. Alternatively, the flange 28 may form a surface-to-surface contact seal with the valve body 16.

A cage 34 is coupled to the valve body 16 and engages the valve seat ring 12. The cage 34 defines an interior bore 36 and at least one passage 38 extending through the cage 34 and through which the fluid flow path 22 passes. As shown in detail in, FIG. 2, a throttling element 40 has an outer surface 42 sized for slidable insertion into the cage interior bore 36. A stem 44 is coupled to the throttling element 40 and is further coupled to an actuator (not shown). The actuator reciprocates the stem 44 and attached throttling element 40 along an axis 46. The throttling element 40 is shown having a seating surface 48 oriented to engage a contact surface or seat 50 of the seat ring 12 when the throttling element 40 is in a closed position. In operation, when the control valve 10 is in the closed position shown in FIGS. 1 and 2, the seating surface 48 of the throttling element 40 sealingly engages the seat 50 of the seat ring 12 to prevent the flow of fluid through the orifice 26 of the seat ring 12 and, consequently, the fluid flow path 22. At the same time, the seal formed by the gasket 32 prevents fluid from flowing around the exterior of the seat ring 12 and leaking toward the outlet 18. When it is desired to open the control valve 10, the actuator causes the stem 44 and throttling element 40 to move upwardly. As the outer surface 42 of the throttling element 40 moves past the passages 38 of the cage 34, fluid from the inlet 20 flows through the passages 38, through the orifice 26 of the seat ring 12, and out through the outlet 18. Those skilled in the art will understand that the fluid flow capacity of the control valve 10 is regulated by the position of the throttling element 40 and the number of passages 38 through which the fluid may flow.

As discussed above, the seat ring 12 is held in position in the bore 24 of the valve body 16 by the threaded retainer 14. The threaded retainer 14 is circular and configured to be disposed about the seat ring 12 above the outer flange 28, and to be received into the bore 24 of the valve body 16. Proximate the top of the threaded retainer 14, an outwardly extending annular flange 60 provides a gripping surface for the threaded retainer 14 during assembly of the control valve 10 as discussed further below. The threaded retainer 14 further includes an inwardly extending annular ring 62 having an inner diameter that is larger than the outer diameter of the seat ring 12 above the outer flange 28 so that the threaded retainer 14 may be disposed around the seat ring 12 as illustrated.

In order to secure the threaded retainer 14 to the valve body 16, a coupling mechanism is provided, with the bore 24 of the valve body 16 including a threaded inner surface 64, and the threaded retainer 14 including a corresponding threaded outer surface 66. The threaded surfaces 64, 66 allow the threaded retainer 14 to be screwed into the bore 24 of the valve body 16, and the engagement between the threaded surfaces 64, 66 prevents movement of the threaded retainer 14 in the direction parallel to the axis 46 and to the movement of the throttling element 40 and the stem 44. The threaded surfaces 64, 66 are configured so that the threaded retainer 14 is screwed down into the bore 24 and retained therein without the bottom surface of the threaded retainer 14 necessarily engaging the top surface of the outer flange 28 of the seat ring 12.

The annular ring 62 is part of the engagement mechanism engaging the valve seat ring 12 to form a seal between the valve seat ring 12 and the bore 24 to prevent fluid flow past the valve seat ring 12 external to the orifice 26. In order to load the seat ring 12 downwardly with sufficient force to form the seal with the inner surface of the bore 24, a plurality of radially spaced threaded holes 68 through the annular ring 62 receive bolts 70 that are screwed down into engagement with the top surface of the outer flange 28 of the seat ring 12. The bolts 70 are tightened down in compression to load the gasket 32 and form the seal preventing the liquid from leaking between the seat ring 12 and the inner surface of the bore 24. The size of the bolts 70, materials from which the bolts 70 are fabricated, and the number and locations of the holes 68 and bolts 70 may be dictated by the configuration of the particular control valve 10 in which the valve seat ring 12 is installed, and the operating requirements of the system in which the control valve 10 is installed.

Assembly of the seat ring 12 and the threaded retainer 14 is relatively simple and generally does not require the use of special tools or machining processes. The gasket 32 and seat ring 12 are placed down into the bore 24 of the valve body 16 with the gasket 32 resting on the shoulder 30 of the bore 24, and the outer flange 28 of the seat ring 12 resting on the gasket 32. The threaded retainer 14 is then inserted into the valve body 16 with the threaded outer surface 66 of the retainer 14 engaging the threaded inner surface 64 of the bore 24. The threaded retainer 14 may be installed by hand unless friction between the surfaces 64, 66 requires the use of a drive tool. In either case, minimal torque is required to seat the threaded retainer 14 into the valve body 16. Once the retainer 14 is screwed into position, the bolts 70 are tightened down onto the outer flange 28 of the seat ring 12 using common tools, such as screwdrivers or Allen wrenches, depending on the configurations of the heads of the bolts 70.

Figure 3A:
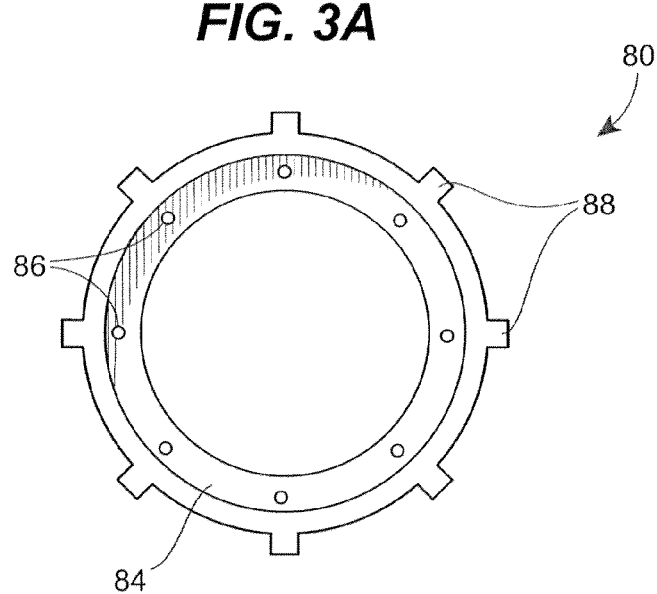
FIG. 3A is a top view of an alternative embodiment of a seat ring retainer having outwardly extending tabs for securing the retainer to the valve body of the fluid flow control device.
Figure 3B:
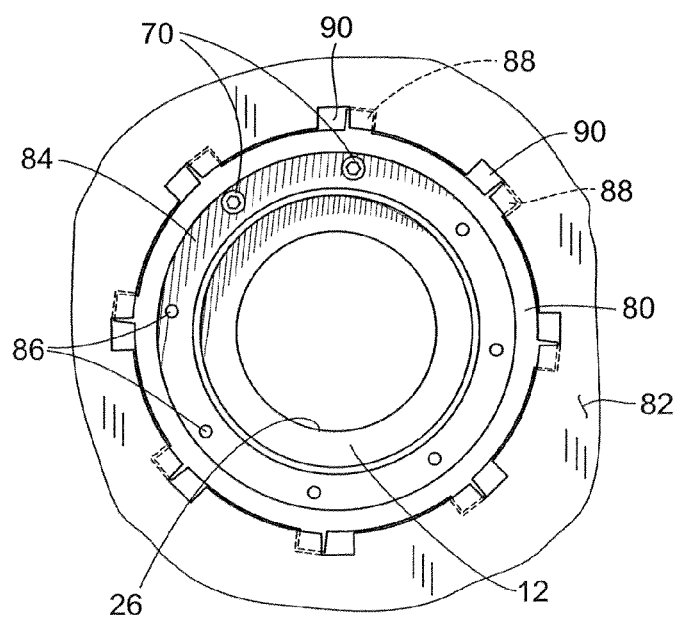
FIG. 3B is a top view of the seat ring retainer of FIG. 3A seated in a flow control device configured to receive the tabs of the seat ring retainer.

FIGS. 3A and 3B illustrate an alternative exemplary embodiment of a retainer 80 that may be secured in a bore of a valve body 82 by a coupling mechanism in the form of a bayonet-type connection. The retainer 80 may have the same general configuration as the threaded retainer 14 described above, and may include an inwardly extending annular ring 84 having holes 86 therethrough for receiving the bolts 70 that will be tightened down onto the upper flange 28 of the seat ring 12. However, instead of the annular flange 60 and threaded outer surface 66 of the threaded retainer 14, the retainer 80 may have a plurality of radially spaced outwardly extending tabs 88 that are configured to be disposed within and retained by corresponding L-shaped recesses 90 in the inner surface of the valve body 82 proximate the bore of the valve body 82. The recesses 90 include openings that receive the tabs 88 into the recesses 90, and overhanging lips that secure the tabs 88 within the recesses 90 after the retainer 80 is partially rotated.

The control valve including the retainer 80 is assembled in a similar manner as the control valve 10 described above. The gasket 32 and seat ring 12 are placed down into the bore 24 of the valve body 82 with the gasket 32 resting on the shoulder 30 of the bore 24, and the outer flange 28 of the seat ring 12 resting on the gasket 32. The retainer 80 is then inserted into the valve body 82 with the tabs 88 aligned with the openings of the corresponding L-shaped recesses 90 of the valve body 82. Once the tabs 88 are disposed through the openings of the recesses 90, the retainer 80 is rotated in the clockwise direction as shown in FIG. 3B to position the tabs 88 under the lips of the recesses 90 to retain the tabs 88 within the recesses 90 and prevent substantial movement of the retainer 80 in the direction parallel to the axis 46. If necessary, the tabs 80 and/or recesses 90 may further include detents or other engagement mechanisms (not shown) configured to retain the tabs 88 within the recesses 90 during the operation of the control valve. As with the threaded retainer 14, minimal torque is required to seat the retainer 80 into the valve body 82. Once the retainer 80 is rotated into position, the bolts 70 are tightened down onto the outer flange 28 of the seat ring 12 using common tools, such as screwdrivers or Allen wrenches, depending on the configurations of the heads of the bolts 70. The cage 34, throttling element 40 and bonnet of the control valve are then installed in/on the valve body 82.

Seat ring retention mechanisms such as those described above offer advantages over previously-known mechanisms such as those described above. As compared to the screwed-in seat rings, the seat ring retainers 14, 80 require lower torque values during installation and removal of the retainers 14, 80 and seat ring 12 than are required for screwed-in seat rings because the retainers 14, 80 themselves are not tightened down to form the seal between the seat ring and the bore of the valve body. Instead, the seat ring retainers 14, 80 only require enough torque to overcome friction to be rotated into their proper positions. Greater torque is exerted on the bolts 70 being tightened down onto the seat ring 12, but the necessary torque may be applied using standard tools for applying a specified torque when tightening bolts. The bolts 70 also allow for a consistent distribution of force around the perimeter of the seat ring 12 and loading directly over the gasket that may minimize the radial and/or planar distortion of the seat ring 12.

As compared to the screwed-in seat rings, the retainers 14, 80 also facilitate removal and repair of the seat ring 12 with reduced risk of damage to the valve body 16 of the control valve 10. The contact stresses between the retainers 14, 80 and the valve body 16 are less because the retainers 14, 80 are not tightened within the valve body 16 to the same degree as the screwed-in seat rings. Once the bolts 70 are loosened from the seat ring 12 and the corresponding stresses between the retainers 14, 80 and the valve body 16 are reduced, the retainers 14, 80 may be rotated against the remaining friction between the elements and removed from the valve body 16. In the event that the contact stresses prevent the bolts 70 from being unscrewed, portions of the retainers 14, 80 may be cut away without damage to the valve body 16, and the retainers 14, 80 may be replaced without the necessity of repairing the entire valve body 16.

In contrast to the bolted-in seat rings described above which require the precise machining of small tapped holes in the web of the valve, the threaded retainer 14 eliminates the need to machine such holes in lieu of machining the threaded inner surface 64 of the significantly larger diameter bore 24 of the valve body 16. A large diameter thread can be very economically cut into the inner surface of a large valve body. Where necessary, small diameter bolts 70 may be closely spaced about the annular rings 62, 84 to provide even seat ring loading, and thereby minimizing the seat ring distortion and associated leakage between the throttling element and the seat ring, and between the seat ring and the inner surface of the bore, that may occur as a result of widely spacing the bolts. Machining additional holes 68, 86 through the annular rings 62, 84 may be performed much more economically than machining a similar number and dimension of holes in the web of the valve bodies 16, 82.

While the embodiments disclosed herein are described as having particular inlets and outlets defining a specific flow path, it will be appreciated that the inlet and outlet may be reversed without departing from the scope of this disclosure. The retainers disclosed herein would provide the same benefits noted above in applications having a flow-up or a flow-down configuration. Still further, the seat rings and retainers disclosed herein may be applied in any type of control valve or other control valve. The retainer and bolts are particularly useful in large control valves where seat ring sealing and retention are historically problematic, such as in large sliding stem valves as described above, ball valves and butterfly valves.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

The invention claimed is:

1. A control valve comprising:
   a valve body defining an inlet, an outlet, and a fluid flow path extending from the inlet to the outlet;
   a valve seat ring disposed within the valve body and defining an orifice through which the fluid flow path passes;
   a throttling element arranged for securement to an actuator driven reciprocating valve stem and configured to engage the valve seat ring to control fluid flow through the control valve;
   a valve cage disposed within the valve body, the valve cage having a lower portion engaging the seat ring and an interior bore sized to receive the throttling element, the valve cage having a plurality of fluid flow passages through which the fluid flow path passes; and
   a retainer coupled to the valve body and disposed about the valve seat ring, the retainer comprising an inwardly extending ring and a plurality of holes therethrough;
   a plurality of threaded bolts, each bolt extending entirely through a corresponding one of the holes and engaging the valve seat ring to force a surface of the valve seat ring toward a corresponding surface of the valve body such that a seal is formed between the surface of the valve seat ring and the corresponding surface of the valve body to prevent flow past the valve seat ring external to the valve seat ring orifice.

2. The control valve of claim 1, wherein the valve body comprises a threaded inner surface and the retainer comprises a threaded outer surface meshing with the threaded inner surface of the valve body such that the retainer is screwed into the valve body to retain the valve seat ring within the valve body.

3. The control valve of claim 1, wherein the valve seat ring comprises an outwardly extending annular flange, wherein the inwardly extending ring of the retainer is disposed proximate the outwardly extending annular flange of the valve seat ring when the valve seat ring is disposed within the valve body and the retainer is engaged by the valve body.

4. The control valve of claim 3, wherein the inner surface of the valve body defines an annular shoulder, and wherein the outwardly extending annular flange of the valve seat ring is disposed between the annular shoulder of the valve body and the inwardly extending annular ring of the retainer.

5. The control valve of claim 1, comprising a gasket disposed between the surface of the valve seat ring and the corresponding surface of the valve body to form the seal.

6. The control valve of claim 1, wherein the retainer comprises a plurality of outwardly extending tabs and the valve body comprises a plurality of L-shaped recesses configured to receive the tabs of the retainer and to retain the retainer within the valve body against axial movement of the retainer when the retainer is rotated such that the tabs are disposed under lips of the corresponding L-shaped recesses in which the tabs are disposed.

7. The control valve of claim 1, wherein a radially inwardly facing surface of the lower portion of the valve cage directly contacts a radially outwardly facing surface of the valve seat ring.

8. The control valve of claim 1, wherein a radially innermost surface of the retainer faces a radially outwardly facing surface of the valve seat ring.

9. The control valve of claim 1, wherein the lower portion of the valve cage is positioned in a gap formed between the valve seat ring and the retainer.

10. The control valve of claim 1, wherein a lowermost surface of the retainer is radially spaced apart from the valve seat ring.

11. The control valve of claim 1, wherein the surface of the valve seat ring is forced into direct sealing engagement with the corresponding surface of the valve body.

12. The control valve of claim 1, wherein one or more of the plurality of holes is threaded along the entire length thereof, and wherein the respective bolt is threadedly engaged along the entire length of the hole.

13. A method for assembling a control valve having a body defining an inlet, an outlet, and a fluid flow path extending from the inlet to the outlet, a valve seat ring defining an orifice, a throttling element configured to engage the valve seat ring to prevent fluid flow through the orifice, and a valve seat ring retainer, the method comprising:
provides the valve body with internal threads;
providing the valve seat ring with an outwardly extending annular flange;
providing the valve seat retainer with an inwardly extending annular ring and external threads sized to engage the internal threads of the valve body, a plurality of threaded holes extending through the inwardly extending annular ring;
inserting the valve seat ring into a bore of the valve body along the fluid flow path;
threading the retainer into the valve body and positioning the inwardly extending annular ring over the outwardly extending annular flange of the valve seat ring such that a lowermost surface of the retainer is spaced apart from the valve seat ring and does not contact another element of the control valve; and
screwing a plurality of bolts, each extending entirely through a corresponding one of the threaded holes in the inwardly extending annular ring of the retainer and into engagement with the valve seat ring to force a surface of the valve seat ring into engagement with a corresponding surface of the valve body to form a seal between the surface of the valve seat ring and the corresponding surface of the valve body to prevent flow past the valve seat ring external to the valve seat ring orifice.

14. The method of claim 13, wherein the inner surface of the valve body defines an annular shoulder, and wherein the annular flange is disposed between the annular shoulder of the valve body and the annular ring of the retainer.

15. The method of claim 13, wherein the inwardly extending annular ring of the valve seat retainer is positioned so that a downwardly facing surface of the inwardly extending annular ring of the valve seat retainer faces an upwardly facing surface of the outwardly extending annular flange of the valve seat.

16. A control valve comprising:
a body defining an inlet, an outlet, and a fluid flow path extending from the inlet to the outlet;
a valve seat ring disposed within the valve body and defining an orifice, the valve seat ring having a radially outwardly extending flange;
a valve cage disposed within the valve body, the valve cage having a lower portion engaging the valve seat ring and an interior bore, the valve cage having a plurality of fluid flow passages;
a fluid flow path defined at least in part by the orifice and the fluid flow passages;
a throttling element sized to fit in the interior bore of the valve cage and configured to engage the valve seat ring to prevent fluid flow through the orifice when the throttling element is disposed in a closed position closing the fluid flow path, and movable between an open position opening the fluid flow path and the closed position; and
a threaded retainer ring threadably secured to the valve body radially outward of the valve seat ring and radially outward of the lower portion of the valve cage, the retainer ring including an inwardly extending annular ring having a plurality of spaced threaded holes; and
a bolt disposed in each of the threaded holes, each bolt extending entirely through the respective threaded hole and positioned to apply a compressive force directly against the radially outwardly extending flange of the valve seat ring and forcing the valve seat ring away from the retainer ring.

17. The control valve of claim 16, wherein the valve body includes a shoulder, and wherein the radially outwardly extending flange of the valve seat ring is sized and positioned to rest over the shoulder, and wherein the radially outwardly extending flange and the shoulder cooperate to form a seal.

18. The control valve of claim 17, including a gasket disposed between the shoulder and the radially outwardly extending flange.

19. The control valve of claim 17, wherein the valve body includes a threaded inner surface disposed above the shoulder to enable the retainer ring to be threaded into the valve body to advance the inwardly extending annular ring toward the shoulder.

20. The control valve of claim 16, wherein a radially inwardly facing surface of the lower portion of the valve cage directly contacts a radially outwardly facing surface of the valve seat ring.

21. The control valve of claim 16, wherein a radially innermost surface of the retainer faces a radially outwardly facing surface of the valve seat ring.

22. The control valve of claim 16, wherein the lower portion of the valve cage is positioned in a gap formed between the valve seat ring and the retainer.

23. The control valve of claim 16, wherein a lowermost surface of the threaded retainer ring is spaced apart from the valve seat ring and free from contact with another element of the control valve.

* * * * *

UNITED STATES PATENT AND TRADEMARK OFFICE
CERTIFICATE OF CORRECTION

PATENT NO. : 9,038,664 B2
APPLICATION NO. : 11/943330
DATED : May 26, 2015
INVENTOR(S) : Michael McCarty et al.

Page 1 of 1

It is certified that error appears in the above-identified patent and that said Letters Patent is hereby corrected as shown below:

In the Specification:

At Column 2, line 33, "Anther" should be -- Another --.

At Column 3, line 44, "seated in a flow control device" should be -- seated in a body of the fluid flow control device --.

At Column 3, line 67, "to mean ..." similar" should be -- to mean ..." or a similar --.

At Column 6, line 45, "tabs 80" should be -- tabs 88 --.

Signed and Sealed this
Twenty-sixth Day of July, 2016

Michelle K. Lee
*Director of the United States Patent and Trademark Office*